United States Patent [19]

Ziegler

[11] 4,236,592

[45] Dec. 2, 1980

[54] PROTECTIVE STRUCTURE FOR VEHICLES

[75] Inventor: John H. Ziegler, Longmont, Colo.

[73] Assignee: Autotron Products, Inc., Longmont, Colo.

[21] Appl. No.: 758,290

[22] Filed: Jan. 10, 1977

[51] Int. Cl.³ .......................... B60J 1/20; B60K 11/04
[52] U.S. Cl. ...................................... 180/68 P; 296/91
[58] Field of Search ............................ 180/68 P, 68 R; 160/DIG. 1; 296/91, 78 R, 100, 78 A

[56] References Cited

U.S. PATENT DOCUMENTS

| | | | |
|---|---|---|---|
| 1,706,447 | 3/1929 | Goodykoontz | 180/68 P |
| 2,053,576 | 9/1936 | Osten | 160/DIG. 1 |
| 2,067,639 | 1/1937 | Lett | 180/68 P |
| 2,792,254 | 5/1957 | Hagglund | 296/91 |
| 2,868,308 | 1/1959 | Biewald | 180/68 P |
| 3,015,517 | 1/1962 | Thornburgh | 296/91 |
| 3,369,836 | 2/1968 | Haycock et al. | 296/78.1 |
| 3,494,658 | 2/1970 | Maes, Jr. | 296/100 |
| 3,815,700 | 6/1974 | Mittendorf | 180/68 P |
| 3,829,152 | 8/1974 | Hobbs | 296/78.1 |
| 3,831,696 | 8/1974 | Mittendorf et al. | 180/68 P |
| 3,863,728 | 2/1975 | Mittendorf | 180/68 P |
| 4,052,099 | 10/1977 | Lowery et al. | 296/91 |
| 4,085,964 | 4/1978 | Hutto et al. | 180/68 P |

Primary Examiner—David M. Mitchell
Attorney, Agent, or Firm—O'Rourke & Harris

[57] ABSTRACT

A structure for protecting front surfaces of moving vehicles from insects and debris and modulating air flow through the vehicle radiator to control cooling efficiency, including an air deflector mounted on the leading edge of the vehicle to deflect air, airborne insects and debris upward and over the windshield, and, a detachable cover depending from the deflector to preclude insects and debris from entering the radiator, the detachable cover being either a non-perforated curtain to limit and control air flow through the vehicle radiator during cold weather operation, or a screen to provide full air flow during warm weather.

7 Claims, 4 Drawing Figures

PROTECTIVE STRUCTURE FOR VEHICLES

BACKGROUND OF THE INVENTION

The present invention relates generally to a structure for protecting the front surfaces of moving vehicles, including the radiator grille and windshield, from insects and other airborne debris encountered on the road. The present invention also relates to a structure for selectively limiting the amount of air flowing through the radiator of a vehicle for the purpose of controlling the operating temperature of the vehicle engine while concurrently providing such protection for the front surface.

DESCRIPTION OF THE PRIOR ART

Insect screens designed to cover the grille area of automobiles and trucks have been seen in various forms for some time. The purpose of these screens has been to stop insects and debris from entering the grille and interfering with the operation of the radiator. Insect bodies and parts could possibly disrupt air flow through the radiator and result in a condition of overheating. Also insects and debris mar and wear the front surfaces.

Air deflection screens, usually mounted on the vehicle hood directly above the radiator grille, have been employed for the purpose of changing the air flow pattern over the hood of a moving vehicle and thus protecting the windshield from insects and debris. The effectiveness of such apparatus has been proven and deflection screens have been in use for some years, especially in areas where flying insects pose a problem during certain seasons of the year.

Because both the hood mounted air deflector and the grille covering insect screen are concerned with reducing the effect of insects encountered while driving, a more conveniently mounted combination of the two devices is a desirable arrangement. U.S. Pat. Nos. 3,815,700, 3,831,696 and 3,863,728, for instance, disclose means by which the radiator and windshield of a moving vehicle may be protected from insects and debris by a perforated screen mounted directly in front of the radiator grille and having an upper portion made of unperforated material extending above the hood line to deflect air, along with insects and debris, upward and away from the windshield. Mounting provisions in these particular examples are similar in that the screens depend upon elastic or adjustable cords to secure them to points within the front wheel wells, the net visual effect being one of impermanance. The cords extend over painted areas and, in general, provide a less than pleasing appearance.

U.S. Pat. No. 2,868,308 discloses a similar screen and deflector combination, with provisions for mounting in an inclined position in front of the radiator grille of a vehicle such that radiator and windshield are protected.

Because the present invention concerns not only protection of vehicle surfaces from insects and debris but also control of the air intake to the radiator, U.S. Pat. No. 2,246,823 is also applicable. This patent discloses an apparatus which includes both a screen for keeping insects from entering the radiator of a vehicle and an adjustable non-perforated curtain to selectively limit airflow through the radiator and thereby control operating temperature of the vehicle engine. This particular invention makes no provision for the protection of the vehicle from airborne insects in that the screen is mounted between the grille and the radiator.

SUMMARY OF THE INVENTION

The present invention, which provides a heretofore unavailable improvement over previous radiator and windshield protection devices, comprises a structure for protecting both the radiator and windshield of a moving vehicle from insects and other airborne debris while providing for selective control of airflow through the vehicle radiator for the purpose of regulating the operating temperature of the engine. The present invention includes an air deflector attractively mounted adjacent the vehicle hood which serves as an upper mounting provision for either an insect trapping perforated screen or a non-perforated curtain for limiting air flow through the radiator, depending upon the season of the year.

Accordingly, an object of the present invention is to provide an easily attached air deflector to be mounted upon the front portion of a vehicle for the purpose of altering airflow over the hood and carrying airborne insects and debris over the windshield of the vehicle.

Another object of the present invention is to provide an apparatus which may be configured so as to preclude insect bodies and parts from entering a vehicle radiator and interfering with cooling system operation while simultaneously protecting the vehicle windshield from insects and debris.

Still another object of the present invention is to provide an apparatus which may be configured so as to allow control of the volume of air flowing through a vehicle radiator, thereby determining the relative effectiveness of a vehicle cooling system, while simultaneously protecting the vehicle windshield from insects and debris.

Yet still another object of the present invention is to provide a structure for protecting the front portion of a vehicle and controlling airflow therethrough and thereover while providing a neat and attractive appearance of being an integral component of the vehicle.

DETAILED DESCRIPTION OF THE INVENTION

Figure 1:
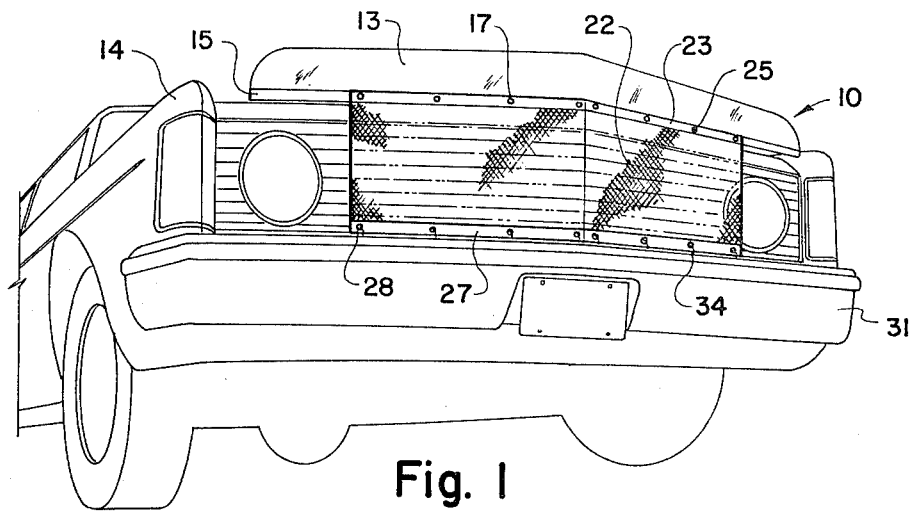
FIG. 1 is a perspective view of an automobile with the protective apparatus of the present invention attached thereto and configured for the purpose of trapping and deflecting insects and debris.
Figure 2:
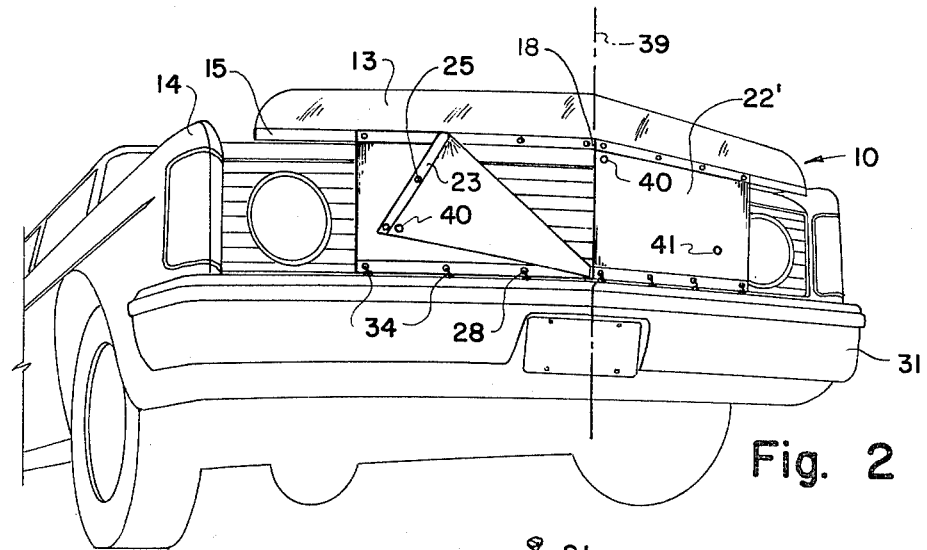
FIG. 2 is a perspective view of an automobile with the protective apparatus of the present invention attached thereto and, in part, configured for the purpose of modulating airflow to the radiator and deflecting insects and debris, and, in part, configured to permit a more substantial but still limited airflow.
Figure 3:
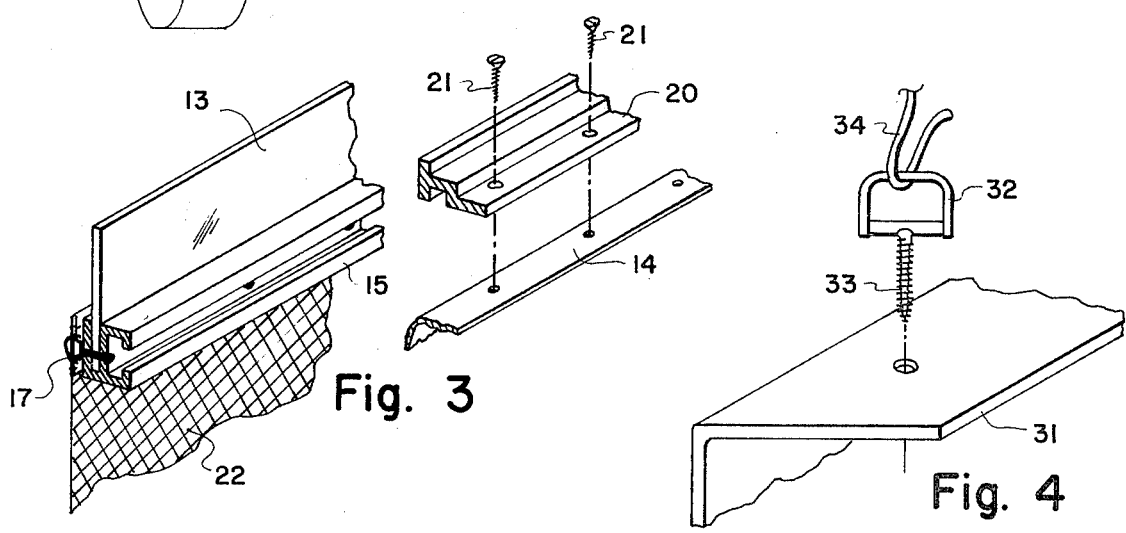
FIG. 3 is an exploded perspective view, partially in section, of the upper mounting apparatus.

Turning now to the drawings, wherein like components are designated by like numerals throughout the various figures, a structure for protecting the front surfaces of a vehicle and modulating air flow through the vehicle radiator is illustrated in FIGS. 1 and 2 and generally designated by numeral 10. Structure 10 includes an air deflector 13, fashioned from a suitably resilient and flexible material and having channels 15 attached at its lower edge serving the dual purpose of providing a means for mounting deflector 13 on vehicle 14 and supporting releasable fasteners 17 which allow attachment of the various screen configurations to deflector 13. While deflector 13 may be formed of any number of materials, a transparent polymeric material such as polycarbonates, i.e., Lexan polymer, is preferred. Releasable fasteners 17 may be snap fasteners or any of the other such well known fasteners. Channels 15, illustrated in cross section in FIG. 3, also lend a degree of lateral rigidity to deflector 13. Space 18 may advantageously be provided between the right and left channels to allow forming of deflector 13 to a shape consistent with the vehicle hood. Alternatively, channels 15 may also conform to the vehicle shape and extend through the center portion of deflector 13.

Channels 15 fix deflector 13 securely to vehicle 14 by sliding over mounting brackets 20, a plurality of which are fastened directly to vehicle 14 at a fixed member adjacent the hood, preferably by self-tapping screws 21. Channels 15 and brackets 20 hold air deflector 13 solidly to vehicle 14 but provide for a degree of lateral adjustment of deflector 13 for centralized locating and easy removal.

Figure 4:
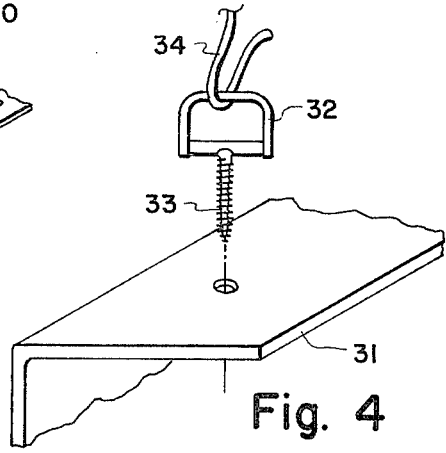
FIG. 4 is a perspective view of the lower mounting apparatus.

Releasable fasteners 17, attached to channels 15, or alternatively directly to deflector 13, and spaced at intervals along the front of deflector 13, allow for attachment of cover 22, as illustrated in FIG. 1. Cover 22, which may be fashioned of a suitable perforated material, such as cover 22 shown in FIG. 1, or of an impervious material, such as cover 22' shown in FIG. 2, has at its upper edge a reinforcing strip 23 containing releasable fasteners 25 spaced so as to align and join with releasable fasteners 17 on deflector 13. Mating of fasteners 17 and fasteners 25 secures the upper edge of cover 22 to deflector 13, placing cover 22 directly in front of the vehicle radiator. The bottom edge of cover 22 is preferably comprised of reinforcing strip 27, pierced at intervals by a plurality of grommets 28. Grommets 28 allow for the attachment of cover 22 to the vehicle bumper 31 or other suitable vehicle body part. Rings 32, illustrated in FIG. 4, are provided, in the preferred embodiment, with self-tapping screws 33 for permanent installation in bumper 31 or other suitable vehicle part so as to align with grommets 28 in reinforcing strip 27 of cover 22, thereby allowing attachment of the lower edge of cover 22 to the vehicle through use of tie cords 34. Cover 22, held in place by releasable fasteners 25 along the upper edge and cords 34 through grommets 28 along the lower edge shields the radiator from insects and airborne debris when in the screen embodiment shown in FIG. 1. In conjunction with cover 22, deflector 13 serves to protect the vehicle windshield. This configuration of apparatus 10, as illustrated in FIG. 1, provides for protection of the major frontal areas of a vehicle in situations where large numbers of insects or large amounts of airborne debris might otherwise hamper safe and efficient operation of a vehicle.

FIG. 2 illustrates the second configuration of apparatus 10 in which screen cover 22 is replaced by non-perforated curtain cover 22'. Cover 22' is similarly equipped with releasable snap fasteners 25 arranged in the same manner as fasteners 25 on cover 22 as described above. Fasteners 25 align and mate with fasteners 17 on deflector 13, allowing cover 22' to be secured along its upper edge to deflector 13. The bottom edge of cover 22' is equipped with grommets 28, spaced in the same manner as discussed above with reference to the lower edge of screen 22, thus allowing screen 22' to be fastened by cords 34 to rings 32 located along bumper 31 or other convenient part of vehicle 14. When fastened along its upper edge to deflector 13 and along its lower edge to rings 32, screen 22' blocks all air flow to the vehicle radiator, as illustrated in the right portion of FIG. 2, to allow vehicle operation in situations of extremely low ambient temperatures.

Screen 22' is divided along its vertical center line 39 to allow partial opening as illustrated at the left portion of FIG. 2. Releasable fasteners 40, located at the upper edge of cover 22' along center line 39, mate with releasable fasteners 41 positioned approximately in the center of the left and right sections of cover 22'. Unfastening several of snap fasteners 25 along the upper central edge of cover 22', allows cover 22' to be folded and secured in a folded position by engaging fasteners 40 and 41. This configuration of apparatus 10 allows partial flow of air through the vehicle radiator for vehicle operation in low ambient temperature conditions.

Summarily, the instant invention provides for a simple, integral mounting of a permanent deflector having secured thereto a cover which may conveniently and readily be interchanged between, for instance, a screen, which permits airflow through the radiator while precluding debris, bugs, etc. from reaching the radiator or the front portion of the vehicle, or alternatively, an impervious cover which limits airflow during colder months. The impervious cover may be partially open to permit limited airflow. While this latter course exposes a small portion of the radiator, insects which may clog the radiator would not be present under such climactic conditions.

While the preferred embodiment of the invention has been described in detail above, it will be recognized that various modifications may be made. For instance, the cover may carry an advertising message or other expression of the vehicle owner and, as a result of the mounting, be quickly changed. While the cords securing the bottom portion of the cover are conveniently tie cords, resilient cords and "S" hooks, for instance, could be employed to tension the cover and facilitate ready changing of the cover. This can be accomplished while maintaining the important integral mounting by utilizing the rings in an unobtrusive position, i.e. the bumper or panels adjacent the bumper, and thus avoid unsightly mountings extending over fenders to wheel wells etc. as in the prior art. Accordingly, although only limited embodiments of the invention have been specifically illustrated and described, it is believed apparent that various changes and modifications will be evident to those skilled in the art, and that such changes and modifications may be made without departing from the scope of the invention as defined by the following claims.

What is claimed is:

1. A structure for protecting the frontal area of a vehicle having an upper forward facing frontal area and a lower forward frontal area, the structure comprising:

an elongated, substantially flat, planar air deflector member having upper and lower portions and an air deflecting surface, and being adapted to be transversely mounted adjacent to the upper frontal area of a vehicle;

releasable fastener means disposed upon the lower portion of the air deflector member;

a pliable cover having upper and lower edges and carrying along the upper edge thereof releasable fastener means complementary to the releasable fastener means disposed along the lower portion of the air deflector member;

securing means positioned along the lower edge of the pliable cover and adapted to be releasably attached to the lower portion of the frontal area of a vehicle immediately below the pliable cover, said securing means tensioning the pliable cover between the air deflector member and the lower portion of the frontal area of a vehicle immediately below the pliable cover; and bracket mounting means extending from the air deflector member and adapted to be fixedly attached to an adjacent upper frontal area of a vehicle and to independently support the air deflector member to a vehicle;

whereby the air deflector member may be conveniently and attractively mounted to a vehicle at a point adjacent the upper forward frontal area of said vehicle, said air deflector member serving as an upper support for the pliable cover.

2. A protective structure as set forth in claim 1 in which the pliable cover is a screen.

3. A protective structure as set forth in claim 1 in which the pliable cover is an impervious material.

4. A protective structure as set forth in claim 3 in which the impervious cover is centrally and vertically divided into two laterally adjacent sections and includes releasable fastening means at adjacent upper corners of the divided sections of the cover and at least one spaced complimentary releasable fastener on each section of the impervious cover, whereby each section of the impervious cover may be partially folded back upon itself and secured by the releasable fasteners at the corner and on the sections to permit a restrictive flow of air to reach the front of the vehicle.

5. A protective structure as set forth in claim 1 in which the air deflector member is transparent.

6. A protective structure as set forth in claim 5 in which the transparent air deflector member is of a polycarbonate material and includes a channel member extending along the lower edge thereof with the releasable fastener means being positioned on the channel member and the bracket mounting means being attached to the channel member.

7. A protective structure as set forth in claim 1 in which the securing means are in the form of elongated ties adapted to be secured to the lower frontal area of a vehicle.

* * * * *